United States Patent [19]

Koop

[11] Patent Number: 4,837,770
[45] Date of Patent: Jun. 6, 1989

[54] FLOWING GAS $CO_2$ LASER

[75] Inventor: Dale Koop, Sunnyvale, Calif.

[73] Assignee: Rofin Sinar, Inc., San Jose, Calif.

[21] Appl. No.: 69,726

[22] Filed: Jul. 6, 1987

Related U.S. Application Data

[63] Continuation-in-part of Ser. No. 811,593, Dec. 19, 1985, Pat. No. 4,709,372.

[51] Int. Cl.⁴ .............................................. H01S 3/22
[52] U.S. Cl. ........................................ 372/59; 372/58
[58] Field of Search .................................. 372/55–60, 372/55, 69, 92; 313/553

[56] References Cited

U.S. PATENT DOCUMENTS

| | | | |
|---|---|---|---|
| 3,970,957 | 7/1976 | Regan | 372/59 X |
| 4,188,592 | 2/1980 | Buczek et al. | 372/59 X |
| 4,660,209 | 4/1987 | Osada et al. | 372/58 |

FOREIGN PATENT DOCUMENTS

| | | | |
|---|---|---|---|
| 0062790 | 5/1980 | Japan | 372/59 |
| 0147182 | 8/1985 | Japan | 372/59 |
| 0144085 | 7/1986 | Japan | 372/59 |

OTHER PUBLICATIONS

Sorem et al., "Catalytic Converters ... TEA Lasers", Rev. Sci. Instrum. 52(8), Aug. 1981, pp. 1193–1196.
Ashurly et al., "Catalytic Regeneration ... $CO_2$ Laser", Sov. J. Quantum Electron, 11(11), Nov. 1981, pp. 1477–1480.
Stark et al., "Platinum-Catalysed ... Laser Gases", Phys. G. Sci. Instrum., vol. 11, 1978.

Primary Examiner—Eugene R. LaRoche
Assistant Examiner—Seung Ham
Attorney, Agent, or Firm—Paul Davis

[57] ABSTRACT

A honeycomb structure is coated with a catalyst to promote reassociation of CO and $O_2$ gases to form $CO_2$. The structure is positioned near the outlet of an optical resonator of a flowing gas $CO_2$ laser. It is preferably positioned within a gas feedback flow system. Utilization of a honeycomb structure minimizes interference of the gas flow within the laser assembly and reduces the introduction of contaminants.

14 Claims, 7 Drawing Sheets

FLOWING GAS CO2 LASER

DESCRIPTION OF RELATED APPLICATION

This is a continuation-in-part of U.S. application Ser. No. 06/811,593, entitled "Fast Axial Flow Laser Circulating System", filed in the United States Patent Office on Dec. 19, 1985 (U.S. Pat. No. 4,709,372), assigned to the same assignee as the present application, and fully incorporated herein by this reference.

FIELD OF THE INVENTION

This invention relates generally to $CO_2$ lasers, and more particularly, to flowing gas $CO_2$ lasers employing a honeycomb catalyst structure which reassociate CO and $O_2$ to form $CO_2$ while at the same time limiting impedance of gas flow through a recirculating flow gas system.

BACKGROUND OF THE INVENTION

With high power $CO_2$ lasers, a large volume of gas flows through an optical resonator. Gas flows as part of a loop system with substantially the same supply of gas flowing into, through, out of, and back through the optical resonator. Gas flow rates on the order of 300 CFM at 100 millibars pressure are not uncommon. Efficiency of the laser decreases if gas flow is hindered. For optimum performance, efficiency and economy, large volumes of gas must be pumped through the resonator, cooled, and then recirculated through the resonator. This cycle continues again and again.

Gas emerging from the resonator is at elevated temperatures of about 200° to 250° C. This is caused by the electrical discharge and lasing activity in the resonator. At these temperatures, $CO_2$ molecules become dissociated, with the resulting formation of CO and $O_2$. The original concentration of $CO_2$ available for lasing is reduced. CO and $O_2$ naturally recombine but an equilibrium level is reached. Additionally, the $O_2$ reacts with $N_2$ in the laser to form various nitrogen oxides. Again the amount of available $CO_2$ is reduced. This change in the original gas mixture affects the laser's performance.

Small $CO_2$ lasers, less than about 100 watts, are sealed systems and do not have gas in a loop feedback system flowing through the resonator. Because these small $CO_2$ lasers are sealed off and fresh gas is not introduced into the system, there has been an on-going effort to minimize $CO_2$ gas loss. Some of these efforts have been directed to catalyzing the gas in an attempt to reassociate CO and $O_2$ and form $CO_2$. Platinum has been used as a catalyst, often as one of the electrodes.

As previously described, large $CO_2$ lasers depend on the constant recirculation of relatively large volumes of gas. Because the efficiency of these lasers is determined to a great extent on an ability to maintain this recirculation, anything which impedes gas flow and reduces the flow rate is undesirable.

Suggestions of placing catalysts in the circulating gas flow path have presented numerous problems. For example, U.S. Pat. No. 4,550,409 discloses the inclusion of a catalyst unit for the purpose of reconstituting $CO_2$ gas. To maximize catalytic effect, the surface area of the exposed catalyst must be as large as possible. In this regard, pellets of a catalyst can be suspended in a cage or basket in a densely packed configuration. This design is highly problematic for large $CO_2$ lasers. The rate of the gas flow is severely reduced when it passes through this grouping of catalyst pellets.

Utilization of pellets creates additional problems. Because the pellets are loose they rub against each other, creating dust and powder. Loose particulate matter contaminates the laser and erodes both its efficiency and lifetime.

It would be highly desirable to provide a catalytic structure suitable for recirculating $CO_2$ gas lasers which would not appreciably affect the flow rate of the circulating gas, and would not be a source of contamination.

SUMMARY OF INVENTION

Accordingly, it is an object of the present invention to provide a $CO_2$ gas laser with minimum gas consumption.

Another object of the present invention is to provide a recirculating $CO_2$ flowing gas laser with low gas consumption.

A further object of the present invention is to provide a flowing gas $CO_2$ laser with low gas consumption and which minimizes the introduction of contaminants into the flowing gas.

Yet another object of the present invention is to reduce the equilibrium concentrations of CO and $O_2$ in a flowing gas $CO_2$ laser.

Still another object of the present invention is to reduce the level of $CO_2$ dissociation in a flowing gas $CO_2$ laser.

Another object of the present invention is to reduce the level of $CO_2$ dissociation in a flowing gas $CO_2$ laser while minimizing gas flow disruption, and minimizing the introduction of contaminants into the gas flow.

A further object of the present invention is to provide a catalyst structure which increases the level of equilibrium $CO_2$ gas in a $CO_2$ flowing gas laser, and which minimizes gas flow impedance and contaminant introduction.

To achieve these and other objects of the present invention, a flowing gas $CO_2$ laser is provided and includes an optical resonator which defines a lasing region where an electrical discharge causes $CO_2$ gas to lase. The optical resonator has a gas inlet and a gas outlet. Means defining a substantially closed gas feedback flow system is operatively associated with the inlet and outlet, and provides for gas flowing and recirculating in and out of the optical resonator. Also included is a means for pumping the flowing gas through the optical resonator and the feedback flow system. A power supply means is operatively associated with the optical resonator to create formation of an electrical discharge in the lasing region of the resonator.

A catalyst member is disposed on a honeycomb structure. This is adapted to maximize exposure of the flowing gas to the catalyst, while minimizing restriction of the flowing as it passes through the honeycomb structure. The honeycomb structure is positioned in the feedback flow system and the catalyst member acts to increase reassociation of CO and $O_2$ to form $CO_2$.

The present invention advantageously employs a honeycomb structure coated with an appropriate catalyst to reassociate CO and $O_2$ to form $CO_2$, and thus enhance the efficiency and lifetime of a flowing gas $CO_2$ laser. Suitable catalysts are selected from the group of noble metals. The preferred catalyst is platinum.

A honeycomb structure is utilized for a variety of reasons. It is comprised of a plurality of individual elongated cells. Interior walls of the cells are deposited with a layer of catalytic material. This structure maximizes the available surface area exposed to the flowing gas stream. Because the catalyst is deposited as a layer on the interior walls of the cells, the effective exposure of catalyst to flowing gas stream is maximized. This design does minimally inhibit the flow of gas, and does not impede laser performance. Because the catalyst is deposited as a layer on the cell walls, as opposed to pellets of catalysts, there is no rubbing activity with the catalyst, and dust or particulates are not produced.

Significantly, the number of cells, as well as their dimensions, can be varied to maximize catalytic activity while permitting a minimal impedance to gas flow. The equilibrium concentration of $CO_2$ is maximized and gas consumption is decreased. This provides for longer lifetime of the entire system and does not cause an appreciable reduction in efficiency which could result if the gas flow rate was impeded.

DETAILED DESCRIPTION OF THE PREFERRED EMBODIMENTS

Figure 1:
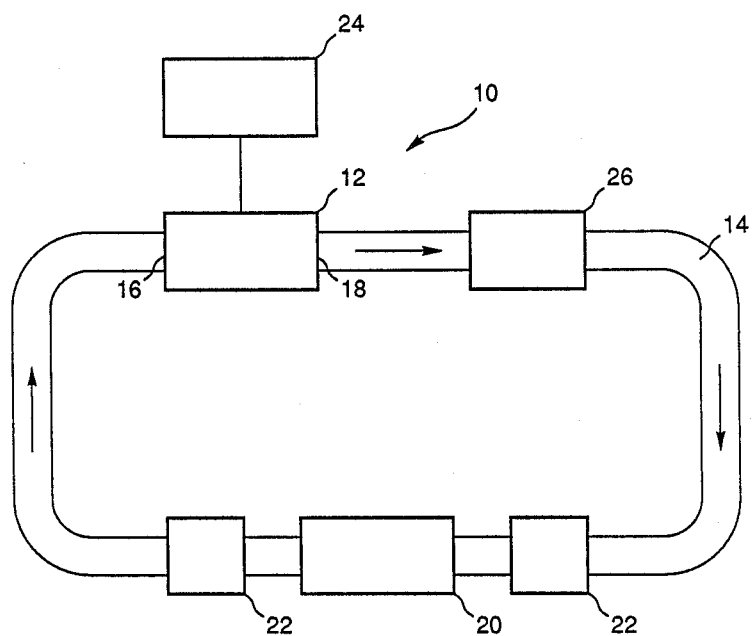
FIG. 1 is a schematic illustration of the present invention showing a closed loop, flowing gas $CO_2$ recirculating laser. A catalyst structure is positioned in the path of flowing gas after it has left the optical resonator of the laser. The catalyst structure is positioned in a gas feedback flow loop.

FIG. 1 illustrates, very generally, the use of a catalyst structure in a flowing gas $CO_2$ laser which includes a substantially closed gas feedback flow system. $CO_2$ and other gases are initially introduced into the flowing gas laser. I5 An electrical discharge is generated in the optical resonator to cause lasing action of $CO_2$ gas. Flowing gases in the system are elevated to high temperatures of about 200° to 250° C.

$CO_2$ molecules dissociate under these conditions and an equilibrium relationship is eventually established as set forth in the equation:

$$2CO_2 \rightarrow 2CO + O_2 \qquad (1)$$

The breakdown of $CO_2$ results in gas consumption which reduces both the lifetime and efficiency of the laser.

As shown in FIG. 1 the flowing gas $CO_2$ laser is denoted generally as 10. A laser, or optical resonator 12, produces a population inversion of lasing molecules to produce lasing action. Preferably, the laser is a fast axial flow $CO_2$ laser as disclosed in U.S. patent application Ser. No. 06/811,593. A substantially closed gas feedback flow system 14 provides a flow path between an inlet 16 and an outlet 18 of resonator 12. Flowing gas recirculates in and out of the resonator 12. In one embodiment the flow rate is about 300 CFM.

Movement of gas through flowing gas laser 10 at these flow rates requires a pump or blower 20. An exemplary pump is disclosed in U.S. patent application Ser. No. 749,053, filed June 25, 1985, assigned to the same assignee of the present application, and incorporated fully herein by reference.

Pump 20 essentially moves gases through resonator 12 and recirculates them by way of feedback flow system 14 which can comprise a plurality of conduits. The conduits are sealed to resonator 12, pump 20 and one or more heat exchangers 22.

A power supply 24 supplies power to resonator 12 so that an electrical discharge is created between one or more cathodes and anodes in resonator 12.

A catalyst member 26 is provided to receive gas from resonator 12 and reassociate CO and $O_2$ to form $CO_2$.

Figure 2:
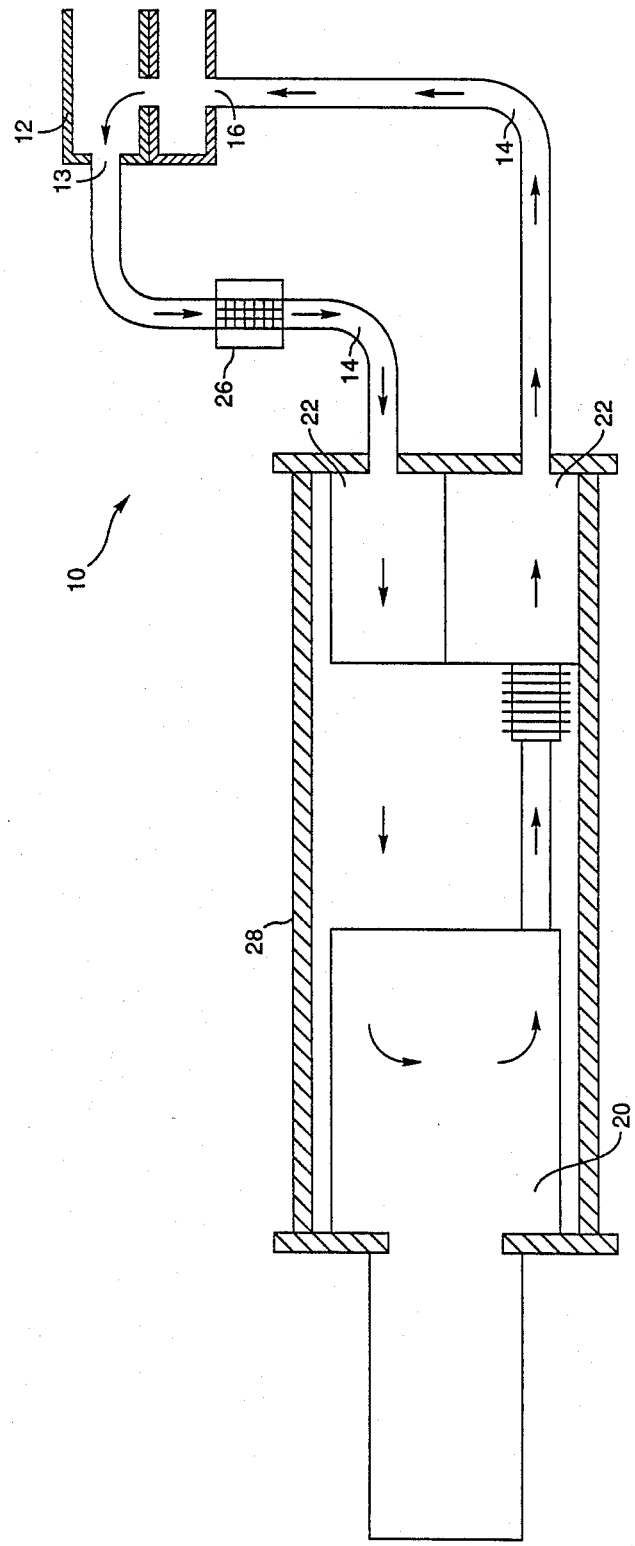
FIG. 2 is a schematic diagram of one embodiment of the present invention. The catalyst structure is disposed in a return conduit, which provides a section of the gas feedback flow loop, between the optical resonator and a heat exchanger. Two heat exchangers and a pump are all positioned in a single housing.
Figure 3:
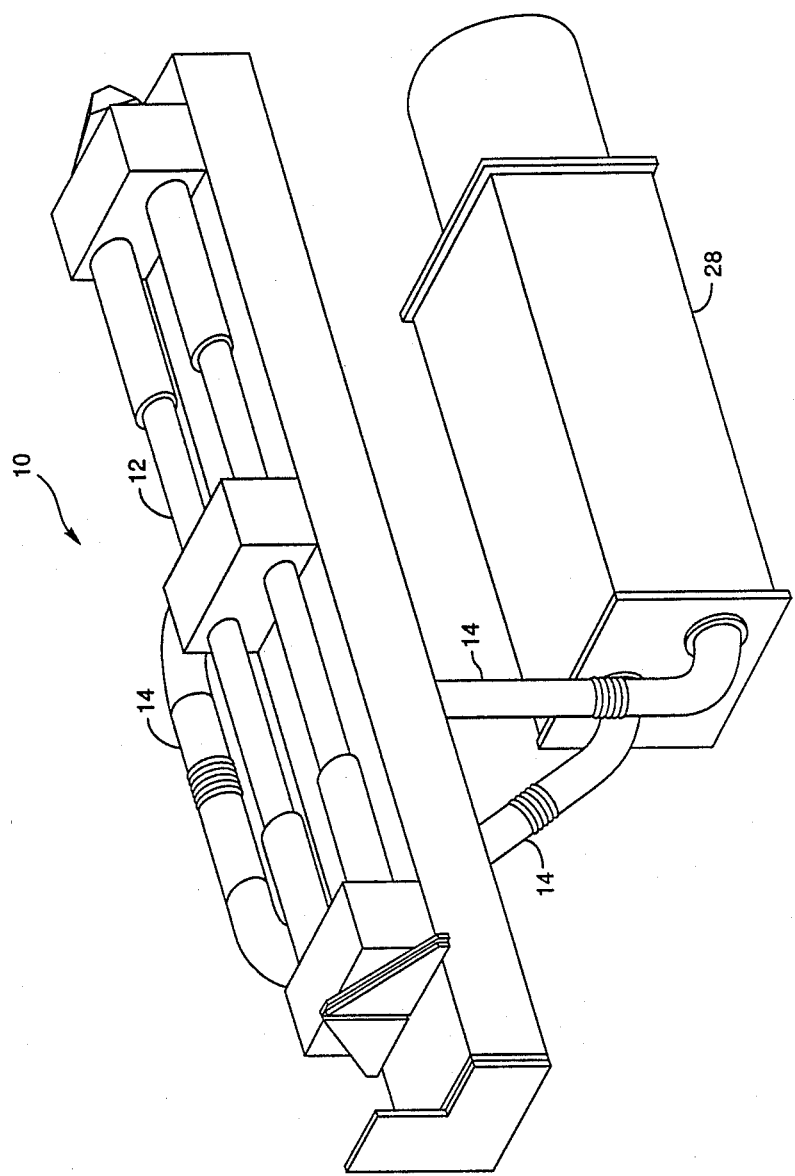
FIG. 3 is a perspective drawing of one embodiment of the present invention. In this embodiment, the heat exchangers and pump are positioned in a single housing. A plurality of conduits are used to serve as a feedback loop for flowing gas to recirculate it through the optical resonator, heat exchangers and pump. The catalyst structure is positioned in a section of conduit.

FIGS. 2 and 3 illustrate an embodiment of the present invention with two heat exchangers 22 and pump 20 arranged in a single housing generally denoted as 28. Gas flow through the laser assembly is indicated by the arrows.

Catalyst member 26 is positioned within laser assembly 10 so that it can receive heated gases from resonator 12 at their elevated temperature of about 200° to 250° C. At this temperature, the catalytic activity of catalyst member 26 acting upon the gases is enhanced. At lower temperatures there is less conversion of the CO and $O_2$ gases to $CO_2$ gas.

In one embodiment of the present invention, catalyst member 26 is positioned along one of the conduits comprising feedback flow system 14 between resonator outlet 18 and a heat exchanger 22. Catalytic activity can then occur before heat exchanger 22 has removed the heat from the returning gas stream.

Figure 4:
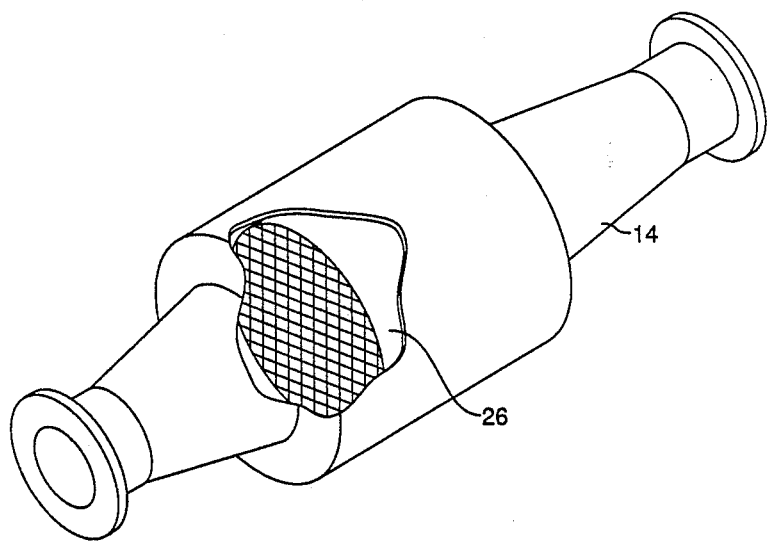
FIG. 4 is a perspective view illustrating the positioning of the catalyst structure in a conduit which forms part of the feedback loop.

FIG. 4 illustrates an embodiment of the present invention in which catalyst member 26 is positioned within the interior of a conduit of feedback flow system 14. As shown, the diameter of catalyst member 26 is greater than the conduit. This provides a greater area for the incoming gas stream to pass through the catalyst member.

In other embodiments, the diameters can be substantially the same, or the conduit can have a variable diameter which increases where catalyst member 26 is positioned. Essentially the dimensions of the conduit and catalyst member 26 can be selected to minimize disruption of the gas flow rate.

Figure 5:
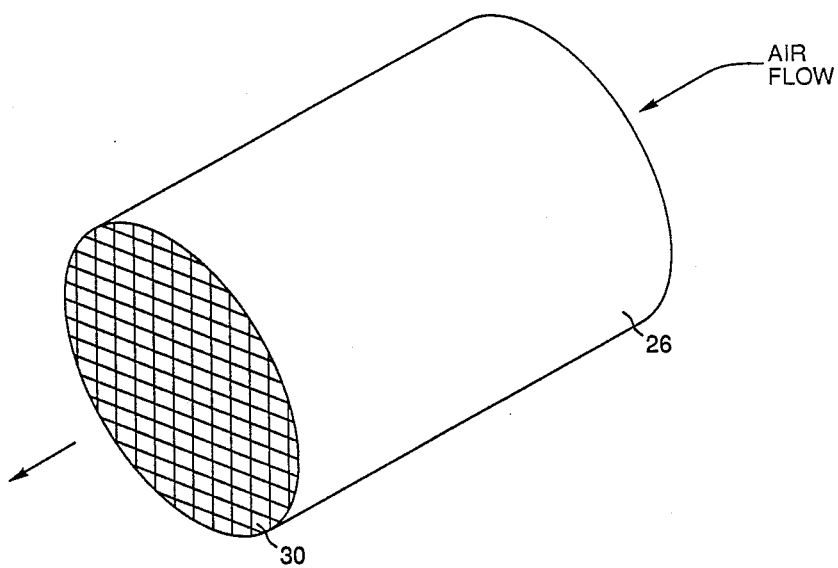
FIG. 5 is a perspective view of one embodiment of the catalyst structure which is formed of a plurality of parallel bundled elongated cells. The interior walls of the cells have an applied layer of catalyst. A honeycomb structure is presented.

The preferred embodiment of catalyst member 26 is shown in FIG. 5. A honeycomb structure 26 defines a plurality of cells 30 which are coated with the catalyst.

This provides a rigid structure with no loose particles to create contamination.

The number of cells within honeycomb structure 28 can vary, as well as the dimensions of individual cells and dimensions of honeycomb structure 26 itself.

An exemplary structure is a cylinder six length and three and one-half inches in diameter. Two hundred individual cells per square inch are provided. Such a structure is available from Corning Glass Works, Corning, N.Y.

Honeycomb structure 28 is particularly suitable for flowing gas $CO_2$ lasers because gas flow is disturbed, if at all, to a very limited extent.

Theoretically, the number of cells within the honeycomb structure 28 can be almost limitless, and hence the available exposed catalyst surface area can be of the desired dimension to push the equilibrium balance (equation 1) towards a virtual zero CO and $O_2$ concentration. This is, however, limited by disrupting the gas flow. A balance between these different factors is achieved. The relationship between the available catalyst surface area (number of cells, and the dimensions of the cells) and the Q=(CFM) flow rate of the gas is approximately as follows:

$$Q = N^{170} \times A \times L \times (0.002)$$

Q=Flow (CFM)
N=#cells/sq.in.
A=cross section area (inches)
L=length (inches)

This equation must be balanced by the pressure drop (across the catalyst). Values for N, A, L, Q can be determined from the equation and FIG. 8.

Figure 6:
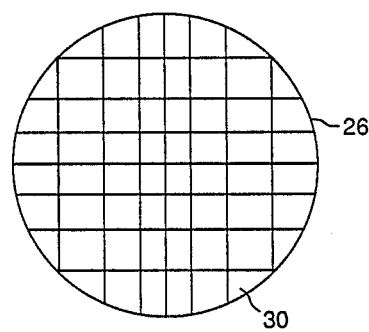
FIG. 6 is a sectional view of a second embodiment of the catalyst honeycomb structure of the present invention. In this embodiment the cells do not have uniform sizes. The diameter of the cells generally decreases towards the center of the honeycomb.

As previously mentioned the cells in honeycomb structure 28 can be of different dimensions. FIG. 6 illustrates one embodiment, wherein the individual cells are generally smaller (with more catalytic surface area) towards the middle of the honeycomb. Again the number and dimensions of the cells will vary depending on gas flow rate and its level of restriction by the cells.

Figure 7:
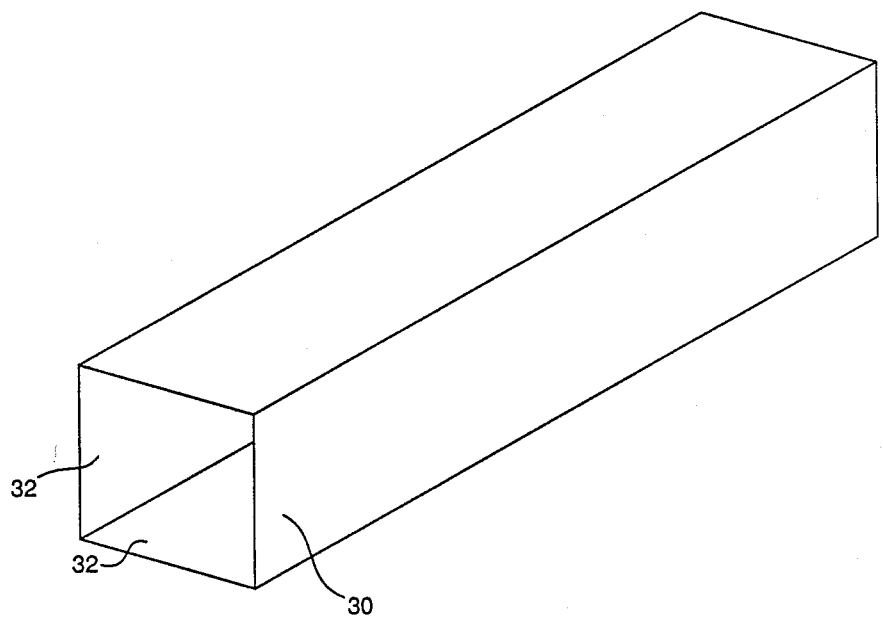
FIG. 7 illustrates a perspective view of an individual cell of the honeycomb structure.

In FIG. 7 an individual cell 30 is illustrated. The interior walls 32 of cell 30 are coated with a catalyst material In one embodiment of the present invention, honeycomb structure 28 is formed of a ceramic including but not limited to alumina, and the like.

A washcoat on honeycomb structure 28 may precede application of the catalyst. The washcoat is porous and increases surface area to promote adherence of the catalyst to walls 32. Suitable washcoats include but are not limited to alumina, and the like. The washcoat can be applied by dipping honeycomb structure 28 into a washcoat solution, followed by drying.

Suitable catalysts include but are not limited to noble metals, and the like. Preferred catalytic materials include platinum, palladium, rhodium, ruthenium, other precious metal catalysts suitable for oxidation, and the like. For laser applications, platinum or a mixture of platinum and other metals are preferred. In any event a mixture of materials can be employed as the catalyst.

The catalyst is applied to honeycomb structure by suitable methods, including but not limited to plating or dipping in chemical solutions. It can be applied leaving a thickness of about several microns.

Figure 8:
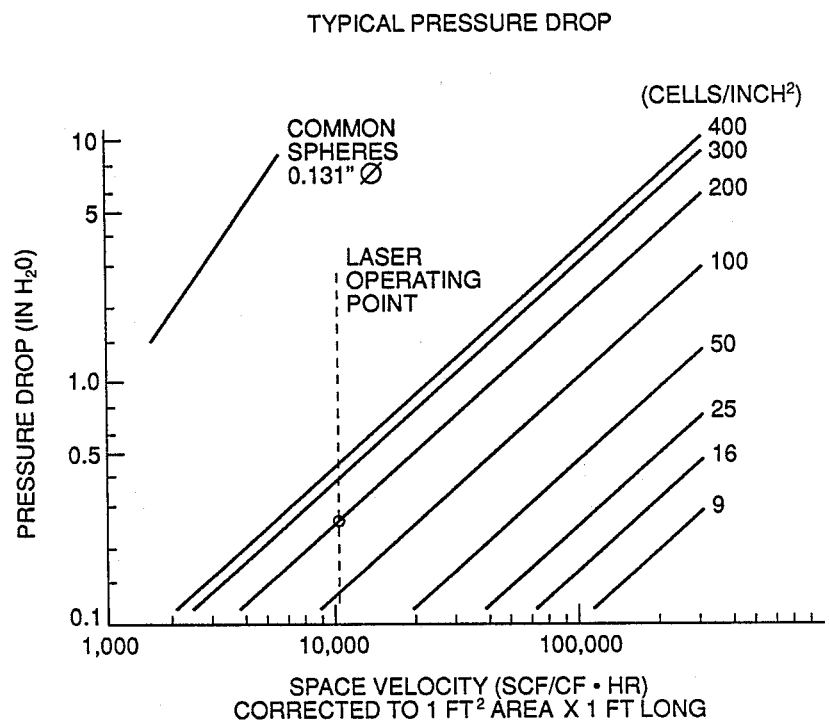
FIG. 8 is a graph plotting gas flow pressure drop against space velocity.

FIG. 8 illustrates in graph form the low pressure drop of gas flow through honeycomb structure 28. Pressure drop and space velocity are plotted, and the operating point of a flowing gas $CO_2$ laser is depicted.

In one specific embodiment of the invention the honeycomb structure 28 was $3\frac{3}{4}$ inches in diameter and 6 inches in length. The number of cells was 400/in² with cross sectional dimensions of 0.05 in². The catalyst was employed in a laser operating at a discharge temperature of about 300° C. with a preferred gas flow rate of about 7–10 g/sec at 100 millibar. Platinum catalyst was plated on the honeycomb structure 28 at a thickness of about 1–5 microns. Exposure of the catalyst to gas flow was about 960 ft²/ft³ of volume. The actual dimensions of the honeycomb structure can vary and lengths of about 0.5 to 6.0 inches are suitable.

While preferred embodiments of the present invention have been illustrated and described, it is to be understood that these are capable of variation and modification, and therefore the present invention is not limited to the precise details set forth, but should be availed to such changes and alterations as may fall with the purview of the following claims.

I claim:

1. A flowing gas $CO_2$ laser assembly, comprising:
   an optical resonator defining a lasing region where an electrical discharge causes $CO_2$ gas to lase, the optical resonator including a gas inlet and a gas outlet;
   means defining a substantially closed gas feedback flow system operatively associated with the gas inlet and outlet;
   means for pumping the flowing gas through the optical resonator and the feedback system, the pumping means being operatively associated with the optical resonator and the feedback flow system;
   power supply means operatively associated with the optical resonator; and
   a catalyst member disposed on a honeycomb structure being positioned in the feedback flow system with the catalyst member acting to increase reassociation of CO and $O_2$ to form $CO_2$ and constructed so that the flow (Q) of gas through the honeycomb structure is defined as follows:

$$Q = N\ AL(0.002)$$

where
   N=the number of cells per square inch
   A=the cross section area measured in inches.
   L=length of the cell measured in inches.

2. The flowing gas $CO_2$ laser of claim 1, wherein the honeycomb structure comprises a plurality of elongated cells disposed within a housing.

3. The flowing gas $CO_2$ laser of claim 2, wherein the number of elongated cells within the housing is maximized to a number which does not reduce a gas flow rate in the feedback flow system by more than about fifty percent.

4. The flowing gas $CO_2$ laser of claim 2, wherein the number of elongated cells within the housing is maximized to a number of cells which doe not reduce a gas flow rate in the feedback flow system by more than about twenty-five percent.

5. The flowing gas $CO_2$ laser of claim 2, wherein the number of elongated cells within the housing is maximized to a number which does not reduce a gas flow rate in the feedback flow system by more than about ten percent.

6. The flowing gas $CO_2$ laser of claim 2, wherein the dimensions of all of the cells are substantially the same.

7. The flowing gas $CO_2$ laser of claim 2, wherein cross sectional dimensions of individual cells decrease going from cells positioned adjacent to the housing to cells disposed substantially along a longitudinal axis of the housing.

8. The flowing gas $CO_2$ laser of claim 2, wherein the catalyst member is rigidly positioned on an exterior surface of the elongated cells.

9. The flowing gas $CO_2$ laser of claim 8, wherein the honeycomb structure is substantially made of a ceramic material.

10. The flowing gas $CO_2$ laser of claim 8, further comprising an adhesive layer deposited on the honeycomb structure with the catalyst member further deposited on the adhesive layer to permit contact between the catalyst member and the flowing gas.

11. The flowing gas $CO_2$ laser of claim 8, wherein the catalyst member includes a material selected from the group consisting of noble metals.

12. The flowing gas $CO_2$ laser of claim 8, wherein the catalyst member includes platinum.

13. The flowing gas $CO_2$ laser of claim 1, further comprising heat exchanger means operatively associated with the feedback flow system and the pumping means, the heat exchanger means being positioned within the feedback flow system to receive the flowing gas from the outlet of the optical resonator and remove heat from the flowing as before it returns to the inlet of the optical resonator.

14. An axial flow $CO_2$ laser assembly, comprising:
   an optical resonator, including a gas inlet and a gas outlet, defining a lasing region where $CO_2$ gas provides lasing action;
   a power supply operatively associated with the optical resonator, the power supply providing energy to the optical resonator to create an electrical discharge therein;
   a gas feedback loop system operatively associated with the gas inlet and outlet of the optical resonator to enable a continuous flow of gas in, through, out and back into the optical resonator;
   pump means positioned in the gas feedback loop to pump gas through the optical resonator and the feedback loop;
   heat exchanger means operatively associated with the gas feedback loop and positioned to receive hot gas from the outlet of the optical resonator and remove heat from the gas which then continues through the gas feedback loop back to the inlet of the optical resonator; and
   a catalyst structure comprising a plurality of bundled parallel hollow cells defined by elongated wall members which have interior surfaces coated with a catalyst layer, the catalyst layer being deposited on the interior surfaces to form rigid layers, the catalyst layer being formed on a catalyst material which promotes reassociation of CO and $O_2$ to form $CO_2$, the catalyst structure being constructed so that the flow (Q) of gas therethrough is defined as follows:

$$Q = AL(0.002)$$

where
N = the number of cells per square inch
A = the cross section area measured in inches
L = length of the cell measured in inches.

* * * * *